(12) United States Patent
Schanz (10) Patent No.: US 10,962,433 B2
(45) Date of Patent: Mar. 30, 2021

(54) PRESSURE SENSOR AND PRESSURE MEASURING METHOD

(71) Applicant: Trafag AG, Bubikon (CH)

(72) Inventor: Christoph Schanz, Frickenhausen (DE)

(73) Assignee: TRAFAG AG, Bubikon (CH)

( * ) Notice: Subject to any disclaimer, the term of this patent is extended or adjusted under 35 U.S.C. 154(b) by 502 days.

(21) Appl. No.: 15/911,820

(22) Filed: Mar. 5, 2018

(65) Prior Publication Data

US 2018/0259411 A1 Sep. 13, 2018

(30) Foreign Application Priority Data

Mar. 3, 2017 (DE) .......................... 102017104547.3

(51) Int. Cl.
| | | |
|---|---|---|
| *G01L 9/00* | (2006.01) | |
| *G01L 13/02* | (2006.01) | |
| *G01L 9/16* | (2006.01) | |
| *G01L 19/06* | (2006.01) | |

(52) U.S. Cl.
CPC ............ *G01L 13/025* (2013.01); *G01L 9/007* (2013.01); *G01L 9/16* (2013.01); *G01L 19/0618* (2013.01)

(58) Field of Classification Search
CPC .......... G01L 13/025; G01L 9/007; G01L 9/16
See application file for complete search history.

(56) References Cited

U.S. PATENT DOCUMENTS

| | | | | |
|---|---|---|---|---|
| 3,940,992 A | * | 3/1976 | Jost ............................ | G01L 9/16 73/728 |
| 4,011,758 A | * | 3/1977 | Reenstra .................... | G01L 9/16 73/728 |
| 4,158,368 A | * | 6/1979 | Clark ...................... | F16K 31/02 137/487.5 |
| 4,374,665 A | * | 2/1983 | Koon ...................... | C22C 45/02 148/302 |
| 4,561,314 A | * | 12/1985 | Alley ...................... | G01L 1/125 73/862.69 |
| 4,621,503 A | * | 11/1986 | Woods ...................... | G01L 9/16 336/20 |
| 6,393,921 B1 | * | 5/2002 | Grimes ...................... | G01L 9/16 73/722 |
| 7,261,005 B2 | * | 8/2007 | Bunyer .................... | G01L 3/102 73/722 |
| 2016/0153861 A1 | * | 6/2016 | Doering ............. | G01L 19/0645 73/114.19 |

FOREIGN PATENT DOCUMENTS

| | | | | |
|---|---|---|---|---|
| CN | 104655718 A | | 5/2015 | |
| DE | 3106835 A1 | * | 9/1982 | ............ G01L 11/008 |
| DE | 3604088 C2 | | 11/1987 | |
| DE | 102006018480 A1 | * | 11/2006 | ............ G01L 9/105 |
| DE | 102006018480 A1 | | 11/2006 | |
| DE | 102006018482 A1 | * | 11/2006 | .............. G01L 9/16 |
| DE | 102013212468 A1 | | 12/2014 | |
| SU | 1420403 A1 | * | 8/1988 | |
| SU | 1775628 A1 | * | 11/1992 | |

* cited by examiner

*Primary Examiner* — Jamel E Williams (74) *Attorney, Agent, or Firm* — Nelson Mullins Riley & Scarborough LLP; Kongsik Kim, Esq.

(57) ABSTRACT

The invention provides a pressure sensor (10) that can be produced at low cost, operates more accurately and resists to high burst pressures. The pressure sensor (10) comprises at least one membrane (12) and a magneto-elastic detection device (14) for magneto-elastically detecting mechanical stress caused by pressurization.

13 Claims, 5 Drawing Sheets

PRESSURE SENSOR AND PRESSURE MEASURING METHOD

The invention relates to a pressure sensor with at least one membrane loaded with a pressure to be measured. The invention further relates to a method for measuring a pressure comprising the step of: loading a membrane with the pressure to be measured.

Such a pressure sensor and such a pressure measuring method are known in prior art from the following documents, for example:

D1 DE 10 2012 100 942 A1
D2 DE 10 2013 114 728 A1
D3 EP 1 281 947 A1
D4 EP 1 677 090 A1
D5 EP 2 251 664 A1
D6 EP 2 446 239 B1

From the above documents pressure sensors are known which have a membrane loaded with the pressure to be measured and particularly formed as an integral part of a pressure body constituted by a one-piece steel body. The membrane is deflected by a pressure, and the deflection is measured and converted into a signal. In the pressure sensors described in documents D1 to D6, the deflection is measured using a resistive method, particularly by using strain gages the electric resistance of which changes upon deflection of the membrane, and the electric resistance is measured by means of a bridge circuit and converted into the signal.

Other pressure sensors available on the market measure the deflections of a membrane to be loaded with pressure in a capacitive or optical or inductive manner, e.g. by eddy current measurements. One example of a measurement of a membrane deflection by eddy current measurements is described in the following document:

D7 EP 2 867 639 B1.

In all the pressure sensors known so far, the deflections of the membrane are measured and converted into a signal.

The invention is based on the object of providing a pressure sensor and a method for measuring a pressure by pressure loading a membrane which can be used universally and exhibit a higher compressive strength compared to previous sensors and methods, while the accuracy is the same or even higher.

The invention achieves this object by providing a pressure sensor as defined in claim 1 and a method as defined in the further independent claim.

Advantageous embodiments are the subject of the subclaims.

According to one aspect of the invention, a pressure sensor is provided which comprises at least one membrane to be loaded with a pressure to be measured, and a magneto-elastic stress detection device for the magneto-elastic detection of pressure-induced mechanical stress.

Preferably, a magneto-elastic stress detection device is provided which relies on active magnetization.

Preferably, said at least one membrane is at least partially formed from a ferromagnetic material and the magneto-elastic stress detection device is designed for magneto-elastically detecting mechanical stress in said membrane.

Preferably, the magneto-elastic stress detection device relies on active magnetization.

Preferably, the magneto-elastic stress detection device is designed for detecting a direction or change of direction of magnetic field lines of a magnetic field induced into the membrane or into an element coupled to the membrane to detect mechanical stress in the membrane or in the element coupled to the membrane from the detected direction or change of direction.

Preferably, the magneto-elastic stress detection device comprises at least one magnetic field generating device for generating a magnetic field flux passing through a region which is mechanically loaded due to the pressure to be measured, and a magnetic field flux detection device for detecting a magnetic field flux in said mechanically loaded region.

Preferably, the magnetic field generating device comprises at least one excitation coil as well as an excitation coil core and the magnetic field flux detection device comprises at least one measuring coil and one measuring coil core.

Preferably, the magnetic field detection device comprises several measuring coils that are sensitive to different directions of magnetic field flux lines.

Preferably, the magneto-elastic stress detection device comprises an excitation coil and an excitation magnet yoke for generating a magnetic field flux in a region mechanically loaded with a pressure to be measured, particularly the membrane, and a measuring coil and a measuring magnet yoke for measuring a magnetic field flow in the region mechanically loaded with the pressure to be measured, wherein the excitation magnet yoke and the measuring magnet yoke form an angle between 5° and 175° to each other.

Preferably, the magneto-elastic stress detection device comprises a central excitation coil as well as a first measuring coil that is connected by means of a first yoke connection to the excitation coil to generate and measure a first magnetic field flux passing through a region mechanically loaded when a pressure is to be measured, particularly the membrane, and a second measuring coil that is connected by means of a second yoke connection to the excitation coil to generate and measure a second magnetic field flux passing through a region mechanically loaded when a pressure is to be measured, in such a manner that the first and the second magnetic field fluxes form an angle within a range of 5° to 175° to each other in the region which is loaded when a pressure is applied.

Preferably, the coils of the magneto-elastic stress detection device are designed as planar coils, particularly in printed circuit board technology.

Preferably, the at least one membrane terminates a first pressure chamber to be loaded with a first pressure on a first side and a second pressure chamber to be loaded with a second pressure on an opposite side, wherein the magneto-elastic stress detection device detects the mechanical stress in the membrane through one of said pressure chambers.

Preferably, the first pressure chamber is in fluid communication with a first pressure channel for loading with a first pressure to be measured, and the second pressure chamber is in fluid communication with a second pressure channel for loading with a second pressure to be measured in order to measure a differential pressure between the first pressure and the second pressure by means of the magneto-elastic stress detection device.

Preferably, the first pressure chamber is in fluid communication with a first pressure channel for loading with a first pressure to be measured, and the second pressure chamber creates a reference pressure volume with a predetermined reference pressure to detect by means of the magneto-elastic stress detection device the pressure in the first pressure chamber as an absolute pressure by comparison with the reference pressure.

Preferably, a first membrane for detecting a first pressure and a second membrane for detecting a second pressure are provided.

Preferably, a first membrane for detecting a first pressure and a second membrane for providing a reference measurement value are provided.

Preferably, a first magneto-elastic stress detection device for detecting a mechanical load on the first membrane and a second magneto-elastic stress detection device for detecting a mechanical load on the second membrane, and an evaluation device for determining a differential value of the outputs of the first and the second tension detection devices are provided.

In a further aspect, the invention provides a method for measuring a pressure, comprising:

a) loading a membrane with the pressure to be measured and b) generating a magnet flux in a region which is mechanically loaded by the pressurization and c) measuring a mechanical stress caused by pressurization of the membrane using the magneto-elastic effect by detecting the change of direction of magnetic field lines of the magnetic flux.

Preferably, step b) comprises generating the magnetic flux in a region mechanically loaded due to pressurization, the region including the membrane that is at least partially constituted by a ferromagnetic material, and step c) comprises measuring the mechanical stress at the membrane by detecting a change of the magnetic field lines in the membrane.

Preferably, the method comprises the step:

Detecting a differential pressure between a first pressure and a second pressure by loading the membrane with the first pressure on a first side and with the second pressure on the opposite second side.

Preferably, the method comprises the step:

Detecting an absolute pressure by applying the pressure to be measured to a first side of the membrane and by applying a predetermined reference pressure to the opposite second side of the membrane, and determining the absolute pressure by detecting the difference between the pressure to be measured and the reference pressure.

Preferably, the method comprises the step:

Providing a reference membrane to which the pressure is not applied, and magneto-elastically detecting a mechanical stress at the reference membrane to obtain a reference value, whereby a measurement signal is obtained in a differential manner by comparison of a value obtained by magneto-elastic detection of a mechanical stress at the pressure-loaded membrane and the reference value.

In a preferred configuration, a closed magnetic flux through the same magnetic conductor—e.g. ferrite core—is generated by a coil assembly disposed around the magnetic field generator. Changes of the mechanical stress of the region passed by the magnetic flux result in a change of the magnetic circuit and hence in a signal.

Preferably, a first magnetic circuit at least partially extending in a first direction of the membrane and a second magnetic circuit substantially extending through the membrane in a second direction are formed, wherein a signal is produced by comparison of changes in the first and second magnetic circuits.

Preferably, the magnetic field sensing device comprises a first pair of measuring coils B1 and B2 and a second pair of measuring coils A1 and A2, wherein the first pair of measuring coils is arranged substantially spaced in a first direction and the second pair of measuring coils is arranged spaced in a second direction running at least partially transversely to the first direction. A mechanical load on a membrane or an element coupled to the membrane against which this assembly is supported and in which a magnetic field is induced, leads to a change in the pairs of coils B1 and B2, whereas the pairs of coils A1 and A2 are not or less affected by this change. A measurement signal preferably results from (A1+A2)−(B1+B2). Relevant parameters for the measurement signal are changes in the inductances, amplitudes and phases of the coils.

Preferably, the coils for generating and/or detecting magnetic fields are designed as planar coils. Particularly preferably, the planar coils are produced using integrated production methods such as the printed circuit board technology. For example, spirally arranged conductors can be formed on different conductive layers of printed circuit elements, and a coil or coil assembly having plural windings can be formed by superposing such printed circuit elements. An integrated production technology of that kind makes it possible to produce the sensor at very low cost.

Advantages of preferred embodiments of the present invention will be described in more detail in the following.

Preferred embodiments of the invention especially relate to the measurement of pressures of fluids in a vast pressure range (e.g. 50 mbar to 3000 bar) using a magneto-elastic method. For this purpose, stresses in a pressurized body are magnetically measured (Villari effect).

A major advantage is the use of steel as a material for the body, as steel is compatible with rather different fluids (motor oil, hydraulic oil, fuel, waste water, sea water, braking fluids, air conditioning media).

In contrary to conventional pressure sensors working in a resistive, piezoresistive or capacitive manner or exploiting the magnetic eddy current effect and based on larger changes of distance or larger deflections of the membrane in a range of typically 10 micrometer, the magneto-elastic sensors of the preferred configurations operate with very small and hardly detectible deformations. These are preferably less than 1 micrometer (e.g. 0.0001 µm to 0.99 µm), and the actual measuring signal is generated by mechanical pressure and tensile stresses in the surface, which are preferably in a range between 10 and 200 MPa.

It is advantageous to use an active technology that prevents magnetization losses over time, because the magnetization is continually re-created. Examples of magneto-elastic stress detection devices employing this active technology and particularly suitable are described in WO2016119931A1, WO2016198658A1 and EP 3 064 919 A1, even though for completely different purposes, namely for torque detection in rotary shafts, which documents are explicitly incorporated herein by reference concerning the details of the structure of the magneto-elastic stress detection device and signal processing.

In contrary to thin film sensors that are preferably used in critical media such as but not limited to cooling circuits in air-conditioning systems or in higher pressure ranges such as in common rail pressure monitoring, the active magneto-elastic technology offers higher sensitivity. Accordingly, about 2 mV/V may be expected as an output signal in resistive thin film cells with long-term stability based on the Wheatstone bridge circuit with the functional layer NiCr. The sensitivity of the inventive active magneto-elastic method is about 3 to 5 times higher and will be 6-10 mV/V for most ferromagnetic materials (preferred materials for the pressure body and/or membrane are steels with high tensile strength (material no. 14542) such as used in the pressure measurement technology, corrosion-resistant steels (material no. 1.4435=316 L), duplex steels such as but not limited to material no. 1.4462). Accordingly, for a typical supply voltage of 5V and a mechanical stress in the material of 200 MPa, wanted signals of 50 mV may be expected. Minimal tensile and compressive stresses of up to 10 MPa can be measured with this method.

The overall size of the planar coils laterally in the coil plane may range up to few millimeters (particularly 2 mm to 20 mm), e.g. 6×6 mm, 8×8 mm or 10×10 mm, the coil diameter and thus also the ferrite core being in the range of 1 . . . 2 mm. The distance of the planar coils from the pressure body preferably is between 0.1 and 3 mm. A variation by 1 mm away from the pressure body will result in a signal loss of approx 20%. In preferred embodiments, the pressure body itself may have a diameter of 5 mm minimum to 20 mm maximum.

A preferred embodiment relates to a pressure sensor that measures pressure relative to the ambient pressure. Especially advantageous is the use of a rather thick membrane which hardly experiences any deflection in the region of the base body. Instead of using a membrane about 0.2 . . . 0.5 mm thick at pressures between 100 and 600 bar, a membrane thickness of 1 mm may be chosen, and an overpressure strength factor will be up to a factor of 6 at pressures of up to 400 bar and a factor of 10 at pressures of up to 100 bar instead of a factor of 2-3.

The overpressure strength is understood to be the ratio of the maximum overpressure to the chosen measuring range that can be applied at the sensor without damaging the sensor. Advantageously, also different materials can be used.

A further preferred embodiment relates to an absolute pressure sensor correspondingly encapsulated in the side remote from pressure so that the sensor measures (a correspondingly set reference volume) relative to a vacuum or "sealed gage". Due to the non-contact method, the sensor can now measure right through a cover plate from aluminum oxide ceramic ($Al_2O_3$) for example. Preferably, the cover plate is applied to the membrane using a low-melting (e.g. 350° C.) glass frit.

It is also possible to implement a differential pressure sensor, wherein a double-profiled membrane may be used instead of a plate, in which membrane internal tensile stresses can advantageously be reduced over radii between 0.2 and 0.6 mm.

Embodiments of the present invention will now be described with reference to the attached drawings of which

The FIGS. 1, 4, 5 and 7 show different embodiments of a pressure sensor 10 having at least one membrane, here in the form of a first membrane 12, which is to be loaded with a pressure, and a magneto-electric stress detection device, here in the form of a first magneto-elastic stress detection device 14, for magneto-elastically detecting a mechanical stress caused by pressurization. In the illustrated embodiments, a magneto-elastic stress detection device is provided which relies on active magnetization.

In the illustrated embodiments, the membrane to be loaded with a pressure is a first membrane, wherein the mechanical stress caused by loading the first membrane with pressure are detected by a first magneto-elastic stress detection device 14.

Further, a second membrane is provided, wherein a second magneto-elastic stress detection device 18 is associated with the second membrane 16 similarly to the first magneto-elastic stress detection device 14 associated with the first membrane 12.

In the illustrated embodiments, the at least one membrane 12, 16 is at least partially formed from a ferromagnetic material, and the respectively associated magneto-elastic stress detection device 14, 18 is configured for detecting mechanical stresses in the associated membrane 12, 16.

Figure 2:
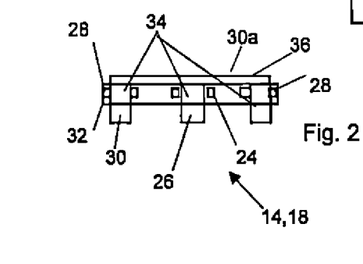
FIG. 2 shows a schematic lateral view of the first magneto-elastic stress detection device.

The first and the second magneto-elastic stress detection devices 14, 18 have similar structures, wherein only the structure of the first magneto-elastic stress detection device 14 will be described in more detail with reference to FIG. 2 and FIG. 3.

The magneto-elastic stress detection device 14, 18 comprises at least one magnetic field generating device 20 for generating a magnetic field flux passing through the region in which stresses are to be detected. Further, the magneto-elastic stress detection device 14, 18 comprises a magnetic field flux detection device 22 for detecting a magnetic field flux in the region in which mechanical stresses are to be detected.

Changes of mechanical stresses on a surface of a body that is particularly formed from a soft magnetic material, lead to changes of permeability as a result of the magneto-elastic effect and thus to changes of a magnetic field flux induced into the surface. The illustrated pressure sensors exploit this effect to directly detect stresses in the membrane loaded with pressure. These stresses are a measure of the pressure acting upon the membrane.

Accordingly, the magnetic field generating device 20 is designed for generating a magnetic flux passing through the region of the associated membrane 12, 16 in which stresses are to be detected, and the magnetic field flux detection device 22 is designed for detecting changes of the magnetic field flux caused by mechanical stresses such as, in particular, changes in the direction of the magnetic flux lines.

The magnetic field generating device 20 comprises an excitation coil 24 and an excitation coil core 26. The magnetic field flux detection device 22 comprises at least one measuring coil 28 and a measuring coil core 30.

A less complex configuration (not further illustrated) of the magneto-elastic stress detection device comprises two magnetically insulated yokes arranged crossing each other at an angle (of preferably 70°-110°), preferably 90°), one of these yokes carrying the excitation coil and the other one the measuring coil. In the illustrated preferred configuration of the magneto-elastic stress detection device 14, 18, four yokes are combined into an x-shape in plan view, wherein the excitation coil core 26 with the excitation coil 24 is provided in a central region and wherein pole arms of said yokes form first to fourth measuring coil cores 30 with first to fourth measuring coils 28, A1, A2, B1, B2. The principle of such measuring heads for inducing a magnetic flux field and for measuring changes in the magnetic field flux is known in the field of torque sensors for the measurement of torque in shafts, see for example WO2016119931A1, WO2016198658A1 and EP 3 064 919 A1 as well as U.S. Pat. No. 2,912,642 A and EP 0 046 417 A1.

In the illustrated configuration of the magneto-elastic stress detection devices 14, 18, the excitation coil cores 26, the measuring coil cores 30 and the yokes are designed as ferrite cores 34 and a ferrite layer 36, wherein the excitation coil 24 and the measuring coils 28, A1, A2, B1, B2 are designed as planar coils 32 in printed circuit board technology. For this purpose, helical conductor tracks on individual printed circuit board planes are connected to the respective coil through multiple layers of such printed circuit board planes and by through-connections, wherein the respective ferrite core 34 extends in the center. For further details concerning the structure of the magneto-elastic stress detection device 14, 18, reference is made to German patent application 10 2016 122 172.4 (not previously published).

Figure 3:
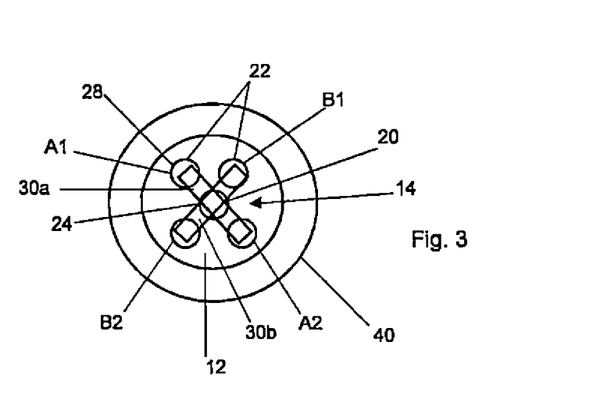
FIG. 3 shows a schematic representation in a top view looking from inside the center of FIG. 1 to the left and at the first membrane so that the first membrane and the magneto-elastic stress detection device are shown.

FIG. 3 shows the first membrane together with the first magneto-elastic stress detection device 14 in an x-shaped configuration with a central excitation coil 24 and outer measuring coils 28, A1, A2, B1, B2. The membrane 12 is made from a steel material. Especially suitable are steels 1.4542, steels 1.4435, corrosion-resistant steels, duplex steels, e.g. 1.4462.

Figure 11:
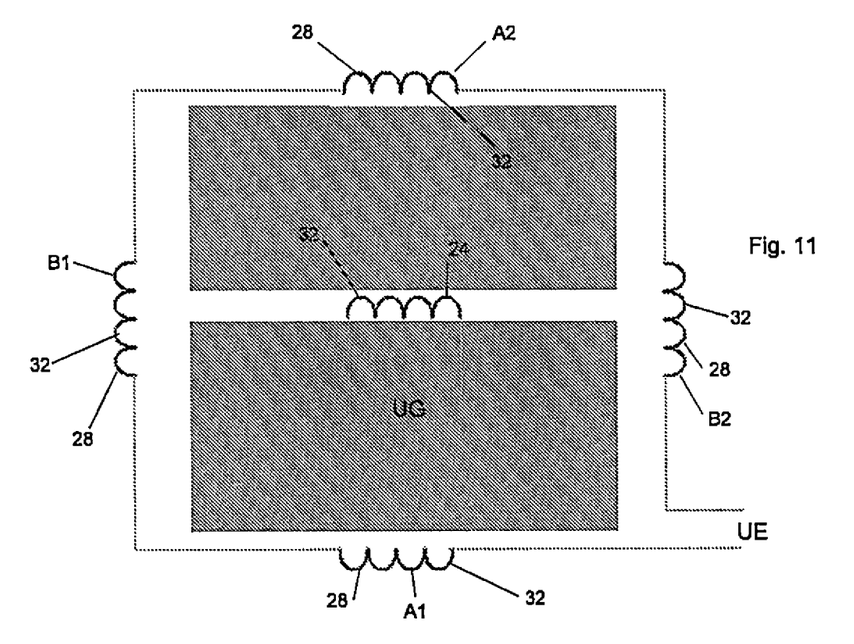
FIG. 11 shows a schematic circuit diagram for connecting coils of the magneto-electric detection device.

FIG. 11 shows an exemplary circuit diagram for the connection of the coils 28, 24. According to this example, the measuring coils can be connected in series so that a measuring signal is obtained by the addition of A1+A2+B1+B2. Such a signal indicates the total of the mechanical stress.

Figure 1:
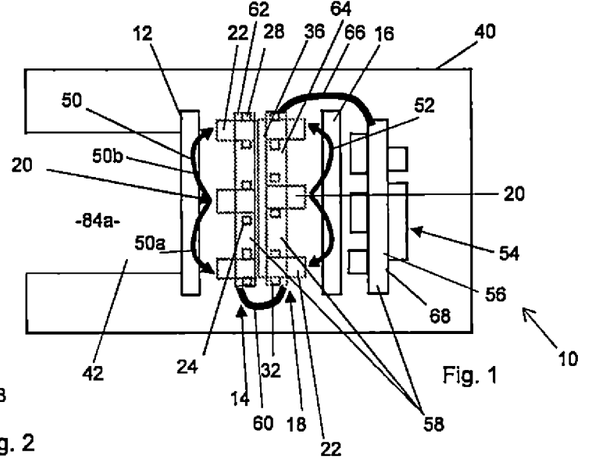
FIG. 1 shows a schematic sectional view of a first embodiment of a pressure sensor having a first membrane to be loaded with a pressure to be measured, and a first magneto-elastic stress detection device for detecting stresses in the first membrane and designed as an absolute pressure sensor.

FIG. 1 shows a first embodiment of a pressure sensor 10 in the form of an absolute pressure sensor. The first membrane 12 is a measuring membrane accommodated in a housing 40 and subjected to a pressure to be measured via a first pressure channel 42. In a modification, which is not illustrated, the first membrane 12 is mounted front-flush with the housing so that no pressure channel leads through the housing and the first membrane 12 is directly loaded with pressure.

Figure 6:
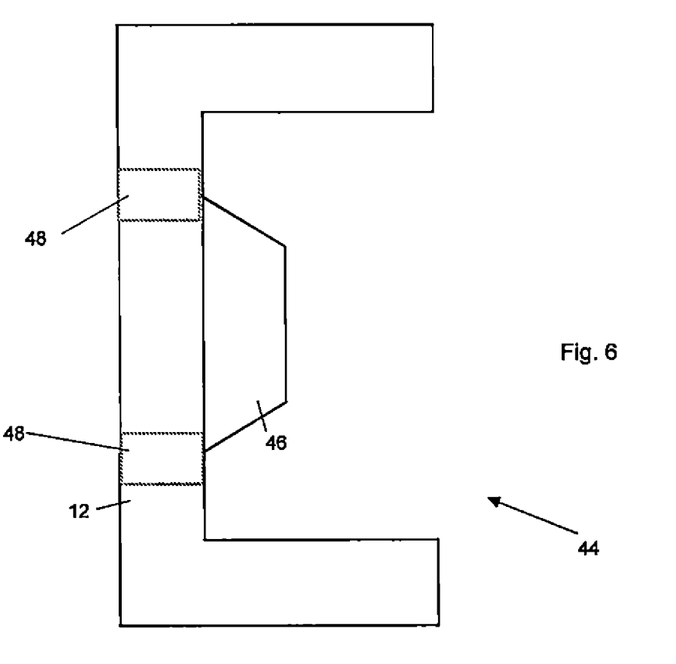
FIG. 6 shows a schematic sectional view of a first membrane suitable for use in one of the embodiments of the FIGS. 1 to 5 and being an integral part of a pressure body, wherein regions of the stresses to be detected by the first magneto-elastic stress detection device are shown.

In the housing 40, the first magneto-elastic stress detection device 14 is arranged in such a manner that the measuring coils 28 are disposed close to those surfaces of the first membrane 12 which are especially mechanically loaded when subject to pressure. For example, as shown in FIG. 6, the first membrane 12 forms an integral part of a pot-shaped pressure body 44 and is centrally provided with a thickened portion 46 so that mechanical stresses concentrate at the transition to this thickened portion. The reference numbers 48 in FIG. 6 denote the mechanically stressed regions in which the stress is detected in a magneto-elastic manner.

As shown in FIG. 1, the magnetic field generating device 20 generates a magnetic flux 50 through these regions 48 which are stressed as a result of pressurization. In particular, changes of permeability in the surfaces are caused by these stresses that lead to changes of the magnetic flux, which are detected by the magnetic field flux detection device 22 by forming a total from the measuring coils A1, A2, B1, B2.

Referring again to FIG. 1 it can be seen that the pressure sensor 10 comprises the second membrane 16 serving as a reference membrane in the interior of the housing 40. Preferably, this membrane 16 has a structure similar to that of the first membrane 12, in particular the same material and the same dimensions. The second stress detection device 18 measures stresses at the second membrane 16 in the same manner as the first stress detection device 14 measures stresses in the first membrane 12. Accordingly, the magnetic field generating device 20 of the second stress generating device 18 generates a further magnetic flux 52 in the second membrane 16 provided as a reference membrane; and changes of the magnetic flux are detected by the magnetic field detection device 22 of the second stress generating device 18.

As shown, the structure built of the second membrane 16 and the second stress detection device 18 can be a mirror image of the structure built of the first membrane 12 and the first stress detection device 14. The stress detection devices 14, 18 can also be combined to one component with a shared ferrite layer 36.

The magnetic field detection devices 22 of the first and the second stress detection devices 14, 18 are connected to each other in such a manner that a differential signal is produced, which is a signal for the pressure on the first membrane 12.

Further, an evaluation device 54 is provided which in the present case is formed by populated electronics 56 that may also be accommodated in the housing 40. The signal from the magnetic field detection device 22 of the second stress detection device 18 is deducted from the signal of the magnetic field detection device 22 of the first voltage detection device 14. This differential signal is evaluated by the evaluation device 54 and a corresponding pressure signal for the absolute pressure is output based on this evaluation.

FIG. 1 shows an embodiment which is particularly preferred in production terms and in which the populated electronics 56 and also the planar coils 32 of the second stress detection device 18 and the planar coils of the first stress detection device are collectively formed with the corresponding connecting lines made from conductor tracks on a printed circuit board 58, wherein a semi-flex or flex-rigid first connector 60 is formed between a first board area 62, on or in which the planar coils 32 of the first stress detection device 14 are formed, and a second board area 64, on or in which the planar coils 32 of the second stress detection device 18 are formed, and a semi-flex or flex-rigid second connector 66 is formed between the second board area 64 and a third board area 68 forming the electronics 56. In other configurations, only two of these board areas 62, 64, 68 are collectively formed or only two of these board areas 62, 64, 68 are connected by a preferably semi-flex or flex-rigid connector 60, 66.

In the following, the operation of the pressure sensor 10 of FIG. 1 will be described in more detail.

Prior art (see D1 to D6) for pressure measurement is that the change in a membrane is measured by strain gages (DMS=German abbreviation of Dehnmessstreifen). The fabrication of the DMS cell is relatively complex and increases the manufacturing costs.

In the pressure sensor 10 according to FIG. 1, there is not measured the deflection of a membrane but rather a mechanical stress in said membrane by means of a magneto-elastic stress detection device 14 that relies on active magnetization. In this manner, the mechanical stress produced as a result of a change of pressure can be measured—the measurement of mechanical stress being clearly more sensitive than the measurement using DMS. Moreover, the membrane needs not be micro-machined. A corresponding structure enables the implementation of a differential measurement that can be used to re-calibrate the pressure sensor 10 in the field.

The pressure sensor 10 has a sensor membrane with a sensor arrangement for stress measurement at a planar surface of the membrane 12. As with magneto-elastic torque sensors, the stress detection device 14 can be implemented using four measuring coils or X-coils disposed around the generator coil.

The lateral view in FIG. 1 shows the structure of the sensor with a reference plate for differential measurement. The two coil pairs for the measuring membrane—first membrane 12—and for the reference membrane—second membrane 16—can be configured as planar coils 32 and produced in a panel allowing small manufacturing tolerances. The ferrite in the center can be configured from one component or from two components. In one embodiment, which is not illustrated, a ferrite may be omitted if the yield is sufficiently high, and the coil arrangement can be configured from a planar coil. The generator coils—excitation coils 24—for the measuring membrane 12 and for the reference membrane 16 can be connected in series and driven by a single source.

Using planar coils 32 instead of wound coils brings significant benefits in manufacturing terms. The planar coils 32 can be fabricated two-dimensionally and can be three-dimensionally processed by appropriate processing technologies. In particular, the manufacture takes place employing the printed circuit board technology.

By the arrangement comprising a measuring membrane—first membrane 12—and a reference membrane—second membrane 16, a differential measurement can be made.

Drifts in the excitation coil 24 caused by aging or temperature can thus be minimized.

These measuring methods allow a measurement clearly more sensitive than direct DMS on a membrane. It is thus possible to use thicker membranes and to achieve an increased overpressure resistance.

The measuring signal essentially is the result of stress in the metal which causes a change of permeability.

This technology can also be used for flat membranes, in particular for front-flush membranes.

Figure 4:
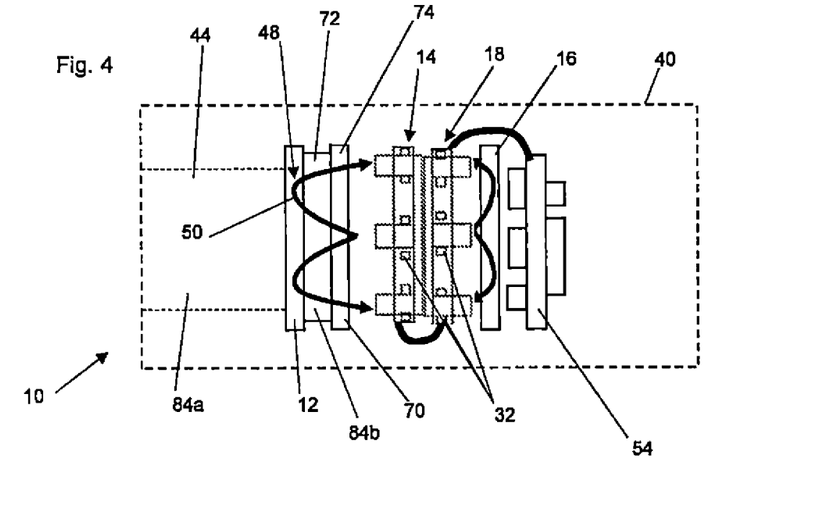
FIG. 4 shows a schematic sectional view of a second embodiment of a pressure sensor having a first membrane to be loaded with a pressure to be measured and a first magneto-elastic stress detection device for detecting stresses in the first membrane, in a further design as an absolute pressure sensor with a reference plate.

FIG. 4 shows a further configuration of the pressure sensor 10, which is the same as the configuration of the pressure sensor 10 in the embodiment of FIG. 1, except for the following differences. Elements similar to those in FIG. 1 are identified by the same reference numbers and their detailed description will not be repeated in the following. Reference is instead made to the foregoing description.

FIG. 4 also shows a pressure sensor 10 configured as an absolute pressure sensor for measuring an absolute pressure. As magnetic fields enable measurements right through the material, an absolute pressure sensor may be configured which measures directly relative to a reference volume.

While the configuration according to FIG. 1 measures a pressure relative to the ambient pressure or can be designed as an absolute pressure sensor by the second membrane 16 terminating a reference volume with a defined pressure (e.g. vacuum), the configuration according to FIG. 4 provides a reference volume (e.g. with vacuum) directly adjacent to the first membrane 12.

For this purpose, a wall 70 from a ferromagnetic material (e.g. ceramics or duplex steel) is provided between the first membrane 12 and the first stress detection device 14 in such a manner that a hermetically sealed reference volume 72 for absolute pressure measurement (particularly evacuated—vacuum) is created between the first membrane 12 and the wall 70.

Figure 10:
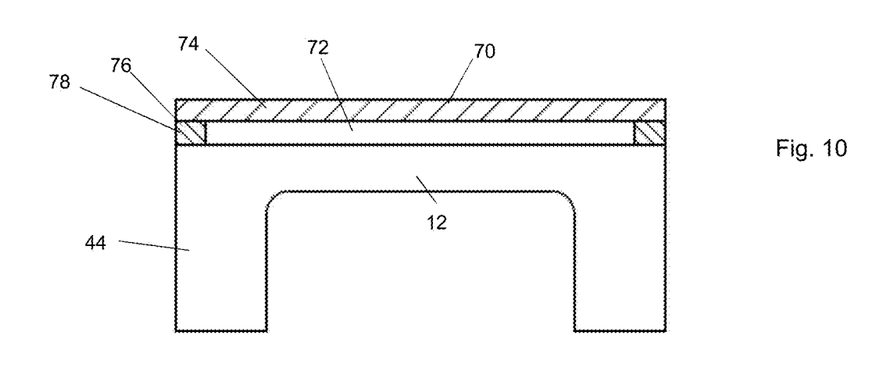
FIG. 10 shows a schematic sectional view similar to that of the FIGS. 8 and 9 of a further pressure body for the practical implementation of the embodiment variant of FIG. 4 having a membrane and a reference plate.

A practical execution example of the first membrane 12 having the wall 70 is shown in FIG. 10. Here, as previously explained with reference to FIG. 1 and FIG. 6, the first membrane forms an integral part of the pressure body 44. For the magneto-elastic detection of surface stresses, the pressure body 44 is made from a suitable ferromagnetic material—see above—and provided with an encapsulation by a ceramic plate 74 as a wall 74 and with a jointing region 76.

When integrated into the structure described with reference to FIG. 1, an absolute pressure sensor can be created that is correspondingly encapsulated at the side which is remote from pressure so that the pressure sensor 10 measures relative to a vacuum or "sealed gage" (a correspondingly set reference volume 72). For example, due to the non-contacting method, the pressure sensor 10 can now measure right through a cover plate 74 formed from aluminum ceramics ($Al_2O_3$). Preferably, the cover plate 74 is applied to the membrane using a glass frit 78 having a low melting point (e.g. 350° C.).

Figure 5:
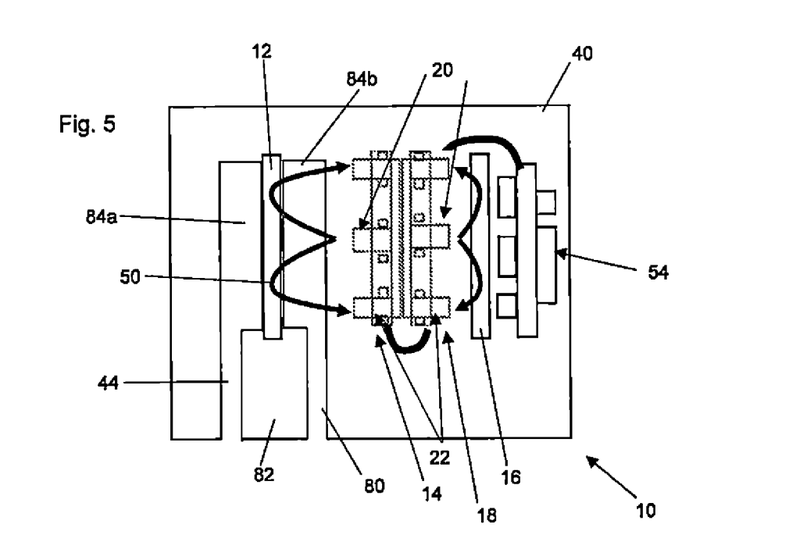
FIG. 5 shows a schematic sectional view of a third embodiment of a pressure sensor having a first membrane to be loaded with a pressure to be measured, and a first magneto-elastic stress detection device for detecting stresses in the first membrane and designed as a differential pressure sensor.

FIG. 5 shows a further embodiment of the pressure sensor 10 configured as a differential pressure sensor. In this case too, the basic structure is comparable to that of FIG. 1, wherein similar parts are identified by the same reference numbers and will not be described in detail any further.

Instead of only the first pressure channel 42, through which only the first membrane 12 is loaded with a pressure to be measured, the pressure sensor 10 in the configuration according to FIG. 5 has a first pressure channel 42, through which the first membrane can be loaded with a first pressure on its first side, and a second pressure channel 80, through which the first membrane 12 can be loaded with a second pressure on its second side.

Accordingly, when a differential pressure occurs between the first pressure and the second pressure, the first membrane is mechanically loaded, and the corresponding stresses are detected similarly to the manner described in the first embodiment.

Instead of using a configuration as shown in FIG. 5, in a modification of FIG. 1, a differential pressure sensor can also be achieved by the first membrane 12 being loaded with the first pressure and the second membrane 15 being loaded with the second pressure. In this modification, the second pressure channel 80 opens into a measuring chamber defined by the second membrane 16. Due to the option of a differential measurement relative to a reference membrane, the configuration according to FIG. 5 is however preferred as a configuration of the differential pressure sensor.

The function of the configuration according to FIG. 5 will be described in more detail in the following.

Known differential pressure sensors relying on a measurement of the deflection of the membrane always require that the sensitive structures are mounted on the membrane and an electrical connection of this structures is made. This fact considerably adds to the cost of the structure of a differential pressure sensor with a steel membrane.

With the magneto-elastic stress detection device 14 that preferably relies on active magnetization, stress in a steel membrane can be measured in a non-contacting manner. A suitable structure allows the implementation of a very small system that can also be designed for very high temperatures and a very high overpressure (burst pressure).

The use of planar coils 32 in place of wound coils is highly beneficial for inexpensive production. The planar coils 32 can be produced two-dimensionally and can then be processed three-dimensionally using corresponding processing techniques.

The measuring membrane—first membrane 12—can consist of steel. In particular, the measuring membrane—first membrane 12—can be welded onto a carrier 82 or can be overmolded with a carrier. A one-piece production of the membrane 12 with the carrier 82 is also possible, analogously to the pressure body 44.

The measuring range and the overpressure range can be defined through the thickness of the first membrane 12.

The measuring coils 28 are capable of measuring right through the carrier 82 or the housing 40, provided the same consists of a diamagnetic or paramagnetic material.

The measuring signal is the mechanical stress in the membrane 12 that leads to a change of permeability.

The pressure sensor 10 can be designed for very high absolute pressures by using a steel housing, or can be produced at rather low cost if the steel membrane is overmolded.

Depending on the structure and the dimension, the sensor element may not require a magnetic flux conductor, i.e. no ferrite in the coil structure will be needed in this case.

The coils 24, 28 can be produced in one production batch employing the planar technology and are thus subject to relatively small production tolerances.

The excitation coils 24 for the measuring membrane—first membrane 12—and those for the reference membrane—second membrane 16—can be series connected to compensate aging factors.

Influences on the measuring or excitation circuits due to aging and temperature can be eliminated by a differential measurement.

Figure 7:
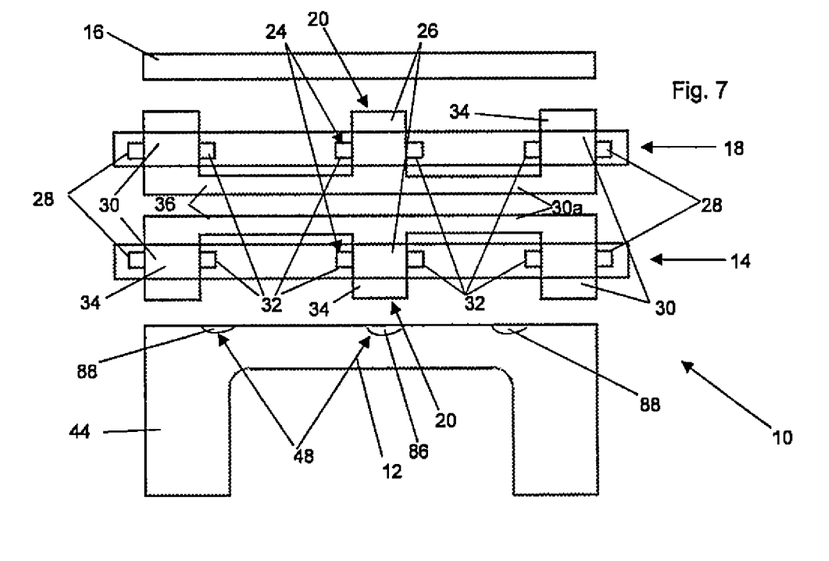
FIG. 7 shows a schematic sectional view of a fourth embodiment of the pressure sensor having a first membrane integrated with a pressure body, a first magneto-electric stress detection device, a second membrane and a second magneto-electric stress detection device.

FIG. 7 shows a schematic arrangement of the magneto-elastic pressure sensor 10 with a ferrite core 34, 36, the planar coils 32 embedded in the printed circuit board—board areas 62, 64 opposite the ferromagnetic measuring body—and the pressure body 44 integrally provided with the measuring membrane—first membrane 12. When pressure is applied to the first membrane, tensile stresses 96 and compressive stresses 88 occur at the surface.

These surface stresses 86, 88 are then detected by the first stress detection device 14 in a differential manner relative to the second stress detection device 18 that is correspondingly coupled to the reference membrane—second membrane 16. Especially surface stresses can be measured particularly well utilizing the magneto-elastic effect.

Figure 8:
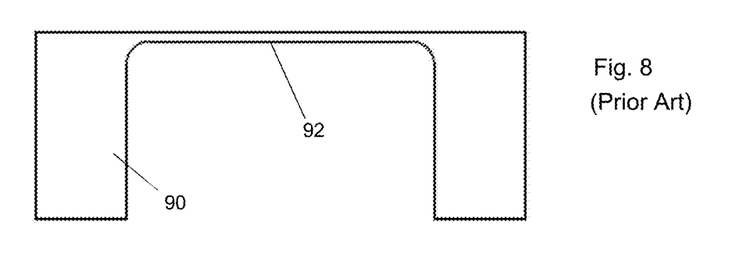
FIG. 8 shows a schematic sectional view of a pressure body provided with an integrated membrane of the prior art in a known pressure sensor according to one of the documents D1 to D6.
Figure 9:
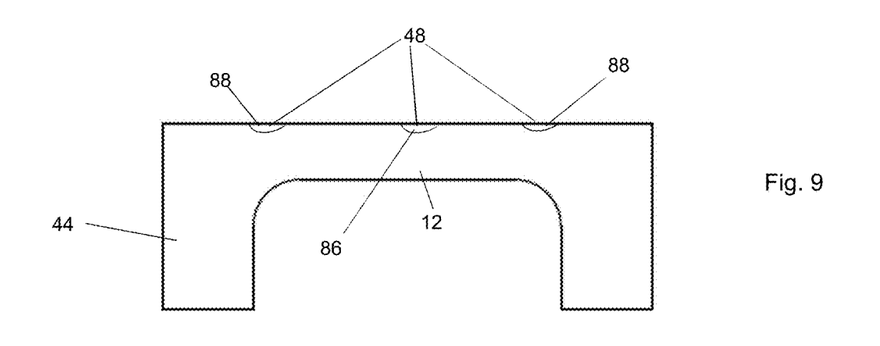
FIG. 9 shows a schematic sectional view of a pressure body for a pressure sensor designed in accordance with the present invention in comparison with the known pressure body of FIG. 8.

In the FIGS. 8, 9 and 10 there are compared a conventional compressive deformation body 90 of a conventional pressure sensor according to prior art and two embodiments of pressure bodies 44 for pressure sensors 10 in accordance with the invention. Since in conventional pressure sensors the deflection of a membrane is measured, the membrane must be designed for a detectable deflection even at correspondingly small pressures to be measured. For this reason, at comparable pressures, the membrane 92 of the conventional compressive deformation body must be very thin.

FIG. 9 shows the pressure body 44 for the same pressure for use in a pressure sensor 10 relying on the principle according to the present invention. Since there are mainly detected stresses and not deflections, the membrane 12 for the magneto-elastic detection of the compressive and tensile surface stresses 86, 88 can be much thicker. Corresponding complementary tensile and compressive stresses 88, 86 occur at the bottom side. The region of neutral zero-stresses in the pressure body 44 is indicated at pos. 94.

The invention relates to the measurement of pressure by means of at least one separate membrane 12. In contrary to pressure measurements in which deflections in tubular housings or similar pressure containers are directly measured, a specially provided separate membrane allows pressures being predetermined more exactly. It is possible to prefabricate the membrane in a manner defined for the pressures to be measured such that prevailing pressures can be exactly inferred from occurring stresses. Especially the surface of a membrane is precisely pre-defined, and the membrane can be optimized regarding an advantageous deformation behavior.

The above-described embodiments show the preferred measurement of mechanical stresses directly at the membrane 12. In modifications, however, it is also possible to couple an element such as a force-measuring bar to the membrane 12 so that stresses at the membrane 12 lead to stresses in said element which are then detected in a magneto-elastic manner.

LIST OF REFERENCE NUMBERS 10 pressure sensor
121 first membrane
14 first magneto-elastic stress detection device
16 second membrane
18 second magneto-elastic stress detection device
20 magnetic field generating device
22 magnetic field flux detection device
24 excitation coil
26 excitation coil core
28 measuring coil
30 measuring coil core
30a first yoke connection
30b second yoke connection
32 planar coil
34 ferrite core
36 ferrite layer
40 housing
42 first pressure channel
44 pressure body
46 thickened portion
48 region in which stress is to be detected
50 magnetic flux
50a first magnetic field flux
50b second magnetic field flux 52 second magnetic flux
54 evaluation device
56 electronics
58 printed circuit board
60 first connector
62 first board area (first stress detection device)
64 second board area (second stress detection device)
66 second connector
68 third board area (electronics 56)
70 wall
72 reference volume
74 cover plate, e.g. from ceramics
76 jointing location
78 glass frit
80 second pressure channel
82 carrier
84a first pressure chamber
84b second pressure chamber
86 tensile stress
88 compressive stress
90 conventional compressive deformation body
92 membrane (prior art)
A1 first measuring coil
A2 second measuring coil
B1 third measuring coil
B2 fourth measuring coil
UE voltage of the measuring coils (measuring signal)
UG supply voltage of the excitation coil (especially high-frequency, range: MHz)

The invention claimed is:

1. A pressure sensor (10), comprising at least one membrane (12) to be loaded with a pressure to be measured, and a magneto-elastic stress detection device (14) for magneto-elastically detecting a mechanical stress caused by this pressurization,
wherein the magneto-elastic stress detection device (14) comprises a central excitation coil (24) and a first measuring coil (A1) connected by a first yoke connection (30a) to the excitation coil (24) for generating and measuring a first magnetic field flux (50a) passing through a region (48) mechanically loaded when a pressure is to be measured, and a second measuring coil (B1) connected by a second yoke connection (30b) to the excitation coil (24) for generating and measuring a second magnetic field flux (50b) passing through the region (48) mechanically loaded when the pressure is to be measured, and
wherein the first and the second magnetic field fluxes (50a, 50b) form an angle in the range between 5° and 175° to each other in the region loaded with pressure.

2. The pressure sensor (10) according to claim 1,
characterized in that
the at least one membrane (12) is at least partially formed from a ferromagnetic material and the magneto-elastic stress detection device (14) is designed for magneto-elastically detecting a mechanical stress in the membrane (12).

3. The pressure sensor (10) according to claim 1 or 2, characterized by one, several or all of the following features: that the magneto-elastic stress detection device (14) relies on active magnetization; that the magneto-elastic stress detection device (14) is designed for detecting a direction or change of direction of magnetic field lines of a magnetic field induced into the membrane (12) or into an element coupled to the membrane (12) to detect a mechanical stress in the membrane (12) or in the element coupled the membrane (12) from the detected direction or change of direction; that the magneto-elastic stress detection device (14) at least comprises a magnetic field generating device (20) for generating a magnetic field flux (50) passing through a region that is mechanically loaded due to the pressure to be measured, and a magnetic field flux detection device (22) for detecting a magnetic field flux in the mechanically loaded region (48); that the magnetic field generating device (20) comprises at least one excitation coil (24) and an excitation coil core (26) and that the magnetic field flux detection device (22) comprises at least one measuring coil (28) and a measuring coil core (30); that the magnetic field detection device (22) comprises several measuring coils (28, A1, A2, B1, B2), preferably in such a manner that the same are sensitive to different magnetic field flux line directions.

4. The pressure sensor (10) according to claim 1, wherein the region (48) mechanically loaded corresponds to the membrane (12).

5. A pressure sensor (10), comprising at least one membrane (12) to be loaded with a pressure to be measured, and a magneto-elastic stress detection device (14) for magneto-elastically detecting a mechanical stress caused by this pressurization,
characterized in that
the magneto elastic stress detection device (14) comprises an excitation coil (24) and a measuring coil (28), wherein the coils (24, 28) of the magneto-elastic stress detection device (14) are designed as planar coils (32) in printed circuit board technology.

6. The pressure sensor (10) according to claims 1 or 5, characterized in that
the at least one membrane (12) terminates a first pressure chamber (84a) on a first side to be loaded with a first pressure and a second pressure chamber (84b) on an opposite side to be loaded with a second pressure, wherein the magneto-elastic stress detection device (14) detects the mechanical stress in the membrane (12) through one of the pressure chambers (84b).

7. A pressure sensor (10), comprising at least one membrane (12) to be loaded with a pressure to be measured, and a magneto-elastic stress detection device (14) for magneto-elastically detecting a mechanical stress caused by this pressurization, characterized in that the at least one membrane (12) terminates a first pressure chamber (84a) on a first side to be loaded with a first pressure and a second pressure chamber (84b) on an opposite side to be loaded with a second pressure, wherein the magneto-elastic stress detection device (14) detects the mechanical stress in the membrane (12) through one of the pressure chambers (84b), wherein the first pressure chamber (84a) is in fluid communication with a first pressure channel (44) for applying a first pressure to be measured and the second pressure chamber (84b) is in fluid connection with a second pressure channel (80) for applying a second pressure to be measured to measure a differential pressure between the first pressure and the second pressure by means of the magneto-elastic stress detection device (14), or the second pressure chamber (84b) creates a reference pressure volume (72) with a predetermined reference pressure to determine the pressure in the first pressure chamber by a comparison with the reference pressure as an absolute pressure by means of the magneto-electric detection device (14).

8. The pressure sensor (10) according to claims 1, 5, or 7, characterized in that
a first membrane (12) for detecting a first pressure and a second membrane (16) for detecting a second pressure and/or for providing a reference measurement value are provided.

9. The pressure sensor (10) according to claim 8, characterized in that a first magneto-elastic stress detection device (14) for detecting a mechanical load on the first membrane (12) and a second magneto-elastic stress detection device (18) for detecting a mechanical load on the second membrane (16), and an evaluation device (54) for determining a differential value from the outputs of the first and the second magneto-elastic stress detection devices (14, 18) are provided.

10. A method for measuring a pressure, comprising:
a) loading a membrane (12) with a pressure to be measured and
b) generating a magnetic flux (50) in a region (48) mechanically loaded by pressurization and
c) measuring a mechanical stress caused by pressure-loading the membrane (12) using the magneto-elastic effect by detecting the change of direction of magnetic field lines of the magnetic flux,
wherein an absolute pressure is detected by loading a first side of the membrane (12) with the pressure to be measured and by loading the opposite second side of the membrane (12) with a predetermined reference pressure and determining the absolute pressure by determining the difference between the pressure to be measured and the reference pressure.

11. The method according to claim 10, characterized in that
step b) comprises generating the magnetic flux (50) in a region (48) of the membrane (12) at least partially formed from a ferromagnetic material mechanically loaded by pressurization and that
step c) comprises measuring the mechanical stress at the membrane (12) by detecting a change of the magnetic field lines in the membrane (12).

12. The method according to claims 10 or 11, characterized by:
detecting a differential pressure between a first pressure and a second pressure by loading the membrane (12) with the first pressure on a first side and with the second pressure on an opposite second side.

13. A method for measuring a pressure, comprising:
a) loading a membrane (12) with a pressure to be measured and
b) generating a magnetic flux (50) in a region (48) mechanically loaded by pressurization and
c) measuring a mechanical stress caused by pressure-loading the membrane (12) using the magneto-elastic effect by detecting the change of direction of magnetic field lines of the magnetic flux,
characterized by
providing a reference membrane (16) not loaded with the pressure and magneto-elastically detecting a mechanical stress at the reference membrane (16) to obtain a reference value, wherein a measuring signal is obtained in a differential manner by comparing a value obtained by a magneto-elastic detection of a mechanical stress at the pressure-loaded membrane (12) with the reference value.

\* \* \* \* \*